July 12, 1927. 1,635,479
G. HUTCHINSON
INDICATOR DEVICE FOR INSTRUMENTS
Filed Sept. 14, 1925  2 Sheets-Sheet 1
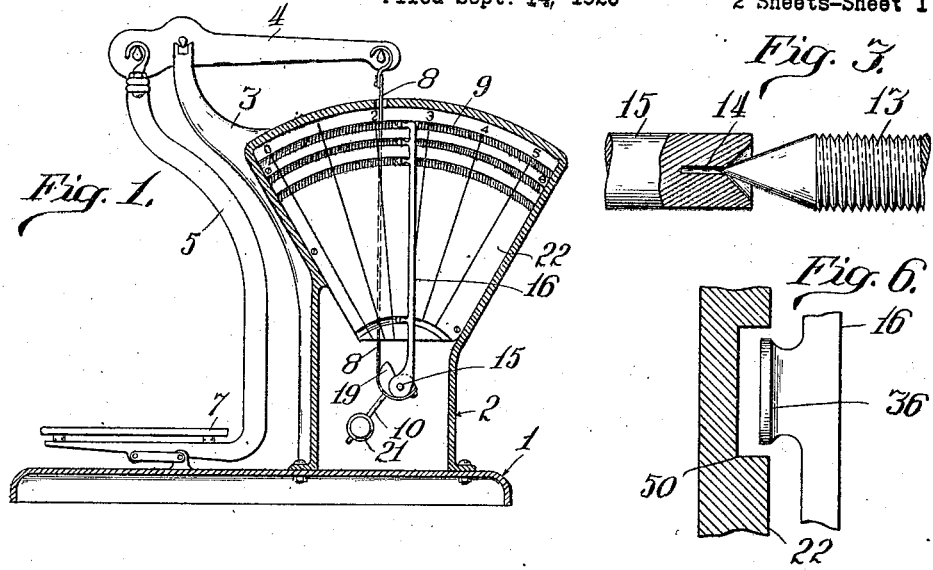
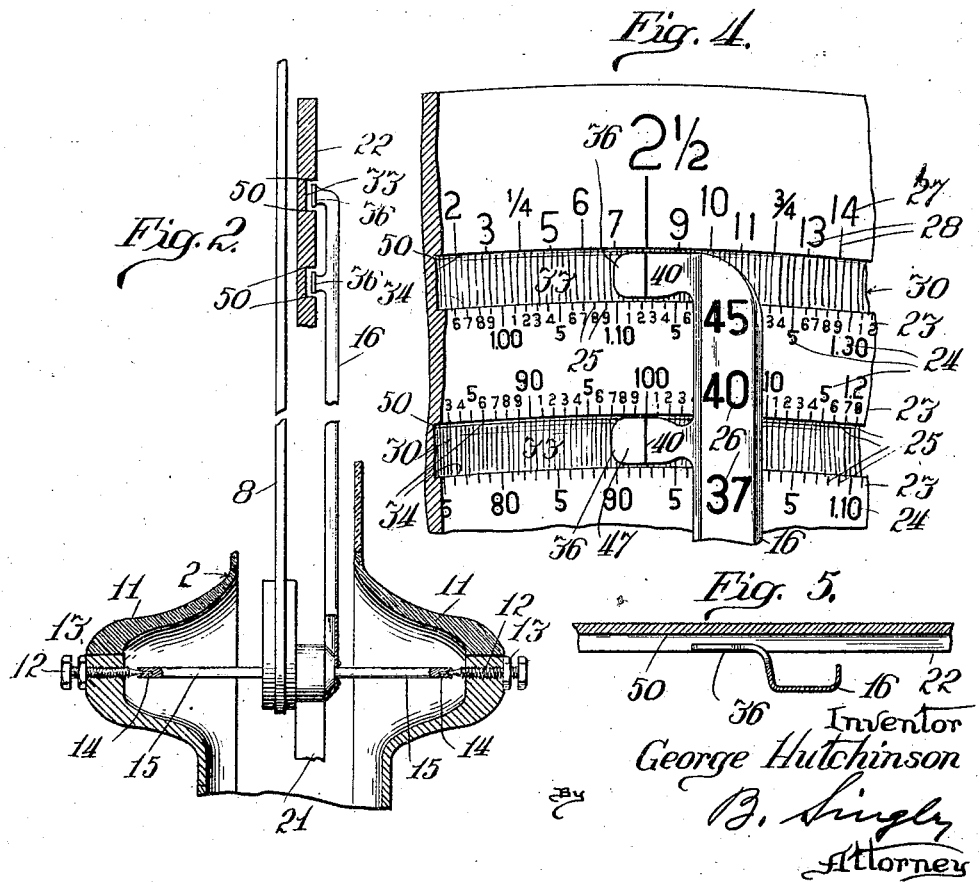
Inventor
George Hutchinson
B. Singly
Attorney July 12, 1927.                G. HUTCHINSON                1,635,479
                        INDICATOR DEVICE FOR INSTRUMENTS
                            Filed Sept. 14, 1925           2 Sheets-Sheet 2
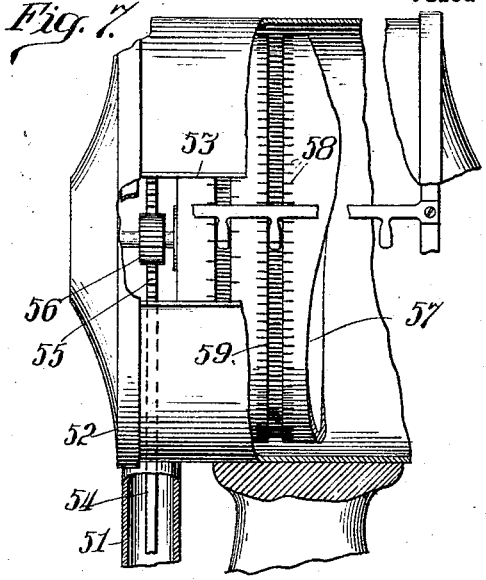
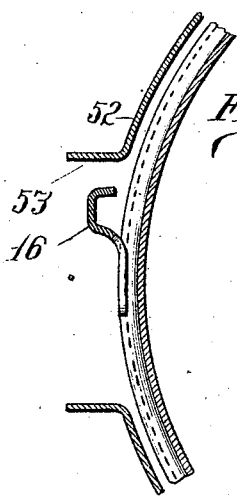
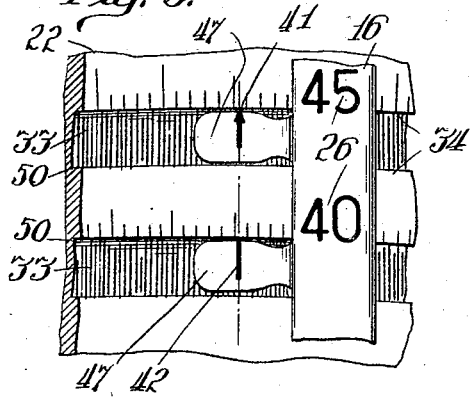
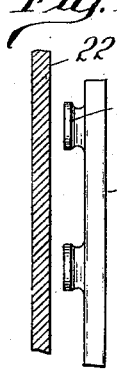
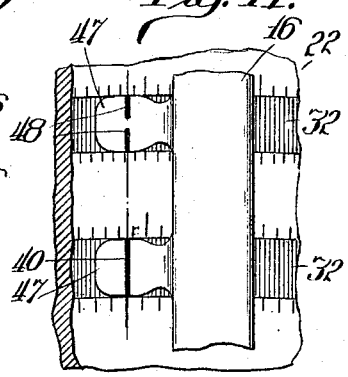
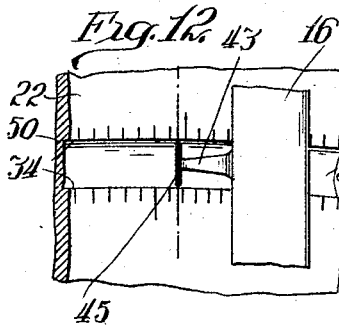
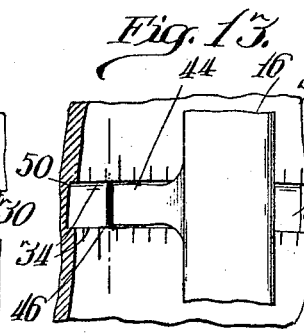
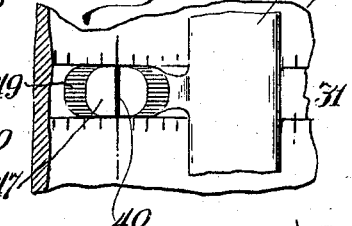
Inventor
George Hutchinson
By B. Singly
Attorney Patented July 12, 1927.

1,635,479

UNITED STATES PATENT OFFICE.

GEORGE HUTCHINSON, OF SHEBOYGAN, WISCONSIN, ASSIGNOR TO HUTCHINSON SCALE COMPANY, OF SHEBOYGAN, WISCONSIN, A CORPORATION OF WISCONSIN.

INDICATOR DEVICE FOR INSTRUMENTS.

Application filed September 14, 1925. Serial No. 56,372.

This invention relates to improvements in indicator devices for instruments, and while in the following specification and in the drawing reference is made specifically to the indicator device for a computing scale, it should be understood that the invention is not limited to this specific manner of use.

It is an object of the present invention to eliminate parallactic errors in the reading of instruments and especially of scales on which readings with great frequency and over a great variety of values have to be made.

It has already been proposed in instruments in combination with charts having rows of designations to use separate fingers for each row and movable relatively to the chart in a path equidistant from the rows. The fingers usually were carried on a common pointer bar, and their edges or corner portions were used as indicating elements.

An object of the present invention is to improve the arrangement of these fingers so as to facilitate the rapid reading of the proper values and to utilize for this purpose indicating elements of substantial width (as compared with their length) in operative relation to the graduations on a chart.

Another object of the invention is to facilitate and accelerate accurate readings making use of contrasting colors, the indicating elements being therefore set off from a background contrasting in color with that of each of the indicating elements at both sides of the same.

It is also an object of the present invention to improve the construction of the fingers of the pointer bar by providing these fingers with rounded ends and alining the indicating elements on said fingers at a distance from the rounded ends.

Another object also aiming at the elimination of parallactic error is to move portions of the indicating elements either directly in the plane of the chart or as close to this plane as possible, and particularly to have the ends of the indicating elements in or near these planes, whereby the danger of parallactic error is reduced or entirely eliminated.

The invention also has the object of arranging for this purpose graduations with marginally defined zones between them, the indicating elements extending transversely of the zones, and each indicating element in some embodiments of the invention being in operative relation to two rows of these graduations.

Another object of the invention is to arrange in an instrument a chart with rows of graduations and recesses or grooves adjacent or between the rows of graduations, the indicating elements being located in said grooves.

With these and numerous other objects in view, the invention is described in the following specification and illustrated in the accompanying drawings.

In the drawings:

Fig. 1 is a vertical sectional, partly diagrammatical view of a weighing scale to which the invention is applied;

Fig. 2 is an enlarged sectional view thru the support of a pointer bar and a portion of a chart;

Fig. 3 is a detail sectional view of an end portion of the pointer spindle and its bearing;

Fig. 4 is an enlarged front elevation of a portion of the chart combined with a portion of a pointer bar;

Fig. 5 is a horizontal sectional view thru the chart and pointer bar illustrated in Fig. 4;

Fig. 6 is a fragmentary enlarged section through a portion of the chart in its relation to a pointer bar which is shown in elevation;

Fig. 7 is a fragmentary side elevation and part section of a portion of a cylindrical chart in connection with a plurality of stationary indicating elements;

Fig. 8 is a transverse section of the arrangement illustrated in Fig. 7;

Fig. 9 is a view in front elevation similar to that illustrated in Fig. 4 of modified indicating elements and a modified chart;

Fig. 10 is a fragmentary section through a portion of the chart combined with a modified pointer bar similar to the view shown in Fig. 6, and Figs. 11 to 14 are different front elevations of portions of modified pointer bars in combination with charts.

In measuring instruments and especially in computing scales at the present time a single indicator is used in most instances, this indicator frequently being in the form of a thin wire or pointer sweeping over the surface of the chart, or where the chart is movable, this movement of the chart being uniform with respect to all parts of the stationary pointer bar or pointer wire. This construction entails considerable danger of parallactic errors in reading.

It has also been proposed in scales to use fingers in combination with a pointer bar. While these fingers have certain advantages over the individual wire, they have been replaced generally by the wire or single pointer, as reading could not be effected as rapidly and with the same exactness. To render the position of the fingers with respect to the surface of the chart very conspicuous the fingers were sometimes coated with a distinctive color over their entire area, and the edge of the finger or even the corner where two edges joined was the point which defined the graduation to be read on the chart. Portions of the surface of the finger were frequently colored differently from other portions but it was always the free edge of the finger which was used to define the reading point.

Where a continuous wire is used as an indicator it not only overlies the graduations which are to be read but also a number of other graduations on the chart, as for instance all graduations on the same radius in a fan chart. By means of the present invention the continuous wire pointer (so to speak) is converted into a plurality of individual indicating elements with gaps between them, so that only those portions of the chart are covered which are free of graduation marks, and the reading is not interfered with. The continuous wire also has the defect of throwing a shadow on the surface of the chart. With artificial light it is frequently difficult to ascertain at a glance what is the wire and what is the shadow. The shadow, however, even though it may be distinguished from the wire, interferes with the clearness of the indications on the chart. These defects are avoided in the present invention owing to the separate support of individual indicating elements and owing to the arrangement of backgrounds of contrasting color for each of these indicating elements.

The embodiment of the invention is illustrated in Fig. 1 in connection with a computing scale which, as shown, comprises a base 1 from which the scale tree or housing 2 rises. This housing is shown here as having an extension 3 serving as a support for a beam 4 to one end of which by means of a knife edge an arm 5 is flexibly connected, this arm carrying at its lower end the platform 7 on which the commodity to be weighed is placed. The other end of the beam 4 is connected by a tension element, as for instance a strap 8 extending downward with the indicating device generally designated at 9, and a counterbalancing device 10, so as to exert an upward lift thereon at all times during operation. Experience has shown that this upward lift exerted by the beam on the indicating device and counterbalancing element is preferable over the customarily encountered construction of a downward pull on this device, since with the upward lift, regardless of the position of the pointer, the support of the same will be held centrally and a danger of lifting the support of the pointer from its bearings is entirely eliminated. The casing 2 of this computing scale is shown in Fig. 2 to have an enlargement 11 thru which the trunnion screws 12 are inserted in direct axial alinement with each other. These pointed screws are adjustable in the walls of the enlargement and may be locked in adjusted position by means of the counter-nuts 13. The points of the screws enter cylindrical sockets 14 of a spindle 15 on which the pointer bar 16 is rigidly secured. The spindle 15 also serves for supporting a cam 19 of well known construction, and to which the strap 8 serving in the present embodiment as a lifting element is secured at one end, while the other end of this strap is flexibly connected with a knife edge of the beam 4. The cam 19 and the pointer bar 16 are, furthermore, rigidly combined with a pendulum 21 which forms the principal part of the counterbalancing device 10. This support of the indicator device 9, cam 19 and counterbalancing device 10 on the spindle has the great advantage of maintaining the entire structure in axial alinement with the cone screws in all positions of the beam 4.

A chart 22 of the well known fan shape is secured in the interior of the casing 2 for cooperation with the pointer bar 16, the chart 22 and pointer bar 16 being relatively movable to each other.

As may be seen from the detail Figs. 4, 9 and 11 to 14, the chart is provided with concentric rows 23 of graduations which in the embodiments illustrated consist of designations or values 24 and graduation marks or lines 25. The designations 24 preferably indicate the prices of different weights of commodities at different unit prices. As in other computing scales of this character, the unit prices may be indicated on the pointer bar itself, as shown for instance at 26, Figs. 4 and 9. Other rows of this chart may have reference to the weight only, as for instance the top row 27, Fig. 4, which shows weight indications exclusively also combined with graduation marks 28. The rows 23, Figs. 4, 7, are separated by marginally defined zones 30, these zones being either blank zones 31, Fig. 14, the area of which is in the same color as the chart itself, or which may be of a different color, as shown at 32, in Fig. 11, or they may be formed as grooves or recesses 33 with their bottom parts in a plane different from the active or indication surface of the chart. In all of these embodiments the margins of the zones 30, 31, 32, 33 are defined by concentric curves 34, or by lines connecting the ends or butts of marking lines 25, or the marginal definition of the zones may be due to the fact that the butts terminate in points having as locus a line which is concentric to the rows of graduations.

The graduations 23, Fig. 4, are arranged in pairs of rows, each row including designations 24 and marking lines 25, and the marking lines again terminate in alined butts. It will also be noted that the designations of all rows are uniformly directed, to facilitate reading.

The pointer bar 16 is preferably a bar of sheet metal which may be provided with lateral flanges for the purpose of strengthening it. It is furthermore provided with laterally projecting fingers, as for instance 36, Fig. 4, which act as carriers for the indicating elements 40. While in known pointer bars with fingers the edges of these fingers served as indicating elements, the indicating elements 40 in the present case are lines of substantial width as compared with their length, these lines extending transversely of the finger 36 either over the whole width of the same, or they extend only over a portion of the entire width, as shown in Fig. 9 at 41 and 42, or at 48 in Fig. 11. Owing to this condition in which the indicating elements are placed on supports and do not form lines of indefinite thickness, the reading is greatly facilitated.

It will also be seen that readability is enhanced through the provision of surface portions of a color contrasting with that of the indicating element. While, for instance, the finger 36 in Fig. 4 is supposed to be white in color, the indicating element 40 in the form of a line of substantial thickness is of a contrasting color. This also applies to the fingers shown in Figs. 7, 9 and 11 in which the indicating elements are all located at a distance from the rounded edges of the fingers, the provision of the rounded corners on these fingers obviously directing the eye of the reader away from the edge and to the indicating element so that no reading based on the position of the edge will be made.

In Figs. 12 and 13 by way of example fingers 43 and 44 respectively are illustrated which are provided with indicating elements 45 and 46 adjacent the edge portion, but in these embodiments also the indicating elements themselves are formed by lines of substantial width and preferably slightly wider than the individual graduation lines on the surface chart.

It will be seen that the indicating element in its position with respect to the graduation marks 25 on the chart 22 is rendered more conspicuous owing to the fact that this contrasting color surface 47 is located at both sides of the indicating element,—a condition which not only applies to the embodiments illustrated in Figs. 4, 9, 10, 11 or 14 but also to the modification illustrated in Figs. 12 and 13 respectively. While in Figs. 12 and 13 the fingers 43, 44 may be provided with a color coating of the same color as the marginally defined zones 30, in the embodiments shown in Figs. 4, 7 or 11 the color surface 47 is in contrast with the color applied to the marginally defined zone, and the conspicuousness of the indicating element is thereby again enhanced.

In all of the embodiments the zones 30 form the background for the fingers 36, and where it is desired to make it easier for the eye to follow the movement of the fingers over zones, the color of which does not contrast with respect to the other surface portions of the chart 22, the fingers themselves may be provided not only with surface portion 47 having a color contrasting with that of the indicating element 40, as shown in Fig. 14, and forming a background for said indicating element, but an additional background 49 of a color different from that of the first mentioned background 47 may be created by applying an additional contrasting color on the finger.

While in ordinary indicating devices comprising a chart and a pointer which may be relatively movable thereto, the indicating element formed by the edge of a finger on the pointer is operated in relation to a single row of graduations only. In the improved device of the present invention the indicating elements 40, 41 and so forth of the fingers 36, as for instance shown in Figs. 4, 11, to 14, or in Fig. 7, are each adapted for cooperation with two of the rows. In Fig. 9, however, again it is illustrated that the present improvement may be applied to a chart 22 in which the indicating elements 41, 42 of substantial width carried on the fingers 36 and having a color contrasting with that of their background 47 are in cooperation each with a single row 23 only. Where this cooperation of each indicating element with two rows is desired, the graduation marks 25 in each row 23 have their butts directed towards the indicating element 40, the butts of the graduation marks 25 being directed towards the vacant zone 30. Each alternate row 23 is then inverted in respect to the direction of its butts, Fig. 4, and the butts of the marks 25 pertaining to the rows of the same pair being directed towards each other to facilitate the reading of each indicating element 40 in cooperation with two rows.

In the top row, Fig. 4, the indicating element 40 is not only in cooperation with a row 23 showing the computed total prices of commodities of a certain unit price, to wit 45 cents, but it is also in cooperation with a row 27 containing weight indications only.

The indicating elements are arranged to intersect, if extended, the lines 34 which are shown to connect the butts of adjacent rows,—an arrangement which greatly assists in eliminating parallactic error.

In the preferred embodiment, as illustrated in Figs. 4 to 9 inclusive, and also as shown for instance in Fig. 12, the indicating elements are located directly in the plane of the surface of the graduations on the chart, since they enter the recesses 50 of the chart 22. The length of these indicating elements may equal approximately the width of these recesses 50, excepting working clearance, but at any rate the ends of the indicating elements are very close to the butts of the graduation marks of the chart. The recesses, as shown in Figs. 4 to 9 or 12 are disposed along portions of circles having the same center as the rows of graduations and therefore they appear as concentric grooves, the fingers 36 on the pointer bar 16 projecting into these grooves by being deflected from the plane of movement of the pointer bar.

In the embodiment illustrated in Figs. 7 and 8, the indicator device is shown as forming part of a drum scale, the housing of which is shown at 51. This housing serves for supporting a stationary drum 52 having a reading slot 53. The mechanism for imparting movement to portions of the indicator device contains a bar 54 terminating in a rack 55 which is in engagement with a pinion 56 mounted on the axis of the indicator drum 57 on which the computation values in the form of graduation marks 58 and designations (not shown) are distributed. Depending upon the weight placed on the platform of this scale a more or less extensive rotary movement will be imparted to the drum 57 which is in cooperation with a stationary pointer bar 58 having laterally projecting fingers 36 also carrying indicating elements 40 of substantial width and extending transversely of the fingers, these indicating elements being placed here also on a background of a contrasting color, namely the color of the finger 36, and this again may be of a color contrasting with that of the cylindrical grooves 59 which separate the pairs of rows 58 on the drum from each other. Similar to the arrangement illustrated in Figs. 5 and 6, the fingers 36 of the stationary pointer bar are here also deflected, as illustrated in Fig. 8, for the purpose of bringing the indicating elements 40 proper into that cylindrical surface on which the graduations are printed, and whereby an error in the reading of the scale is completely avoided. The drum, like the fan chart, is provided with grooves equidistantly related to the rows of graduations, and the indicating elements are located in the grooves, each end of each indicating element being adapted to cooperate with a row of graduations.

I claim:

1. In combination, a chart having rows of graduations, and indicating elements of substantial width as compared with their length, in operative relation to said rows of graduations, said indicating elements being out of coincidence with edges of the surfaces on which they are located.

2. In combination, a chart having rows of graduations, a bar, fingers projecting transversely from the bar, and indicating elements carried by the fingers and extending transversely of the same, the indicating element being out of coincidence with any edge of the finger.

3. In combination, a chart having a plurality of rows of graduations, a pointer, transverse fingers on said pointer, and indicating elements on said fingers, there being a color contrasting with the indicating elements on both sides of the same on the fingers.

4. In combination, a chart having rows of graduations, a bar, fingers projecting transversely from the bar, and indicating elements carried by the fingers and extending transversely of the same, said indicating elements being of substantial width as compared with their length and being out of coincidence with an edge of the finger.

5. In combination, a chart having a plurality of rows of graduations, a pointer, fingers on said pointer, indicating elements on said fingers, the fingers having surface portions of a color contrasting with that of the indicating elements on both sides of the indicating element, said surface portions having uniform color.

6. In combination, a chart having a plurality of rows of graduations, a pointer, fingers projecting transversely from the pointer, and indicating elements on said fingers and located at a distance from the ends of the fingers.

7. In combination, a chart having a plurality of rows of graduations, a pointer, fingers projecting transversely from the pointer and provided with rounded ends, and indicating elements on said fingers and spaced from the rounded ends of the same.

8. In combination, a chart having rows of graduations with marginally defined zones between them, indicating elements, a carrier for the indicating elements, there being a color contrasting with that of the indicating elements at both sides of such elements, the zones being the background of said indicating elements.

9. In combination, a chart having rows of graduations with marginally defined zones between them, a pointer, fingers on the pointer, indicating elements on the fingers, there being a color contrasting with that of the indicating elements at both sides of the same on the finger, the zones forming the background of the fingers.

10. In combination, a chart with graduations, an indicating element, a support for the same, there being a surface portion on the support having a color contrasting with that of the indicating element at both sides of the same to form a background for said indicating element, another surface portion having a color contrasting with that of said background and adjacent thereto, one of said backgrounds being on the support for the indicating element.

11. In combination, a chart having graduations, a pointer, fingers on said pointer, indicating elements on said fingers, there being a surface portion having a color to form a background for said indicating element on said finger at both sides of the indicating element, and another surface portion having a color contrasting with that of the said background and adjacent thereto.

12. In combination, a chart having a plurality of rows of graduations, and indicating elements, each indicating element being in operative relation to two of said rows of graduations and between the same.

13. In combination, a chart having a plurality of rows of graduations, a bar, fingers projecting transversely from the bar, and indicating elements carried by the fingers and extending transversely of the same, each indicating element being in operative relation to two of said rows of graduations.

14. In combination, a chart having rows of graduations, indicating elements in operative relation to said rows of graduations, the rows of graduations having marginally defined zones between them, and mechanism for producing relative movement between the indicating elements and said zones, each indicating element being in operative relation to two rows and between said zones.

15. In combination, a chart having rows of graduations with marginally defined zones between them, a bar, fingers projecting transversely from the bar, indicating elements carried by the fingers and extending transversely of the same, and mechanism for producing relative movement between the fingers and said zones, each indicating element being in operative relation to two rows.

16. In combination, a chart having a pair of rows of graduations and a vacant zone between the same, indicating elements, a common carrier for said indicating elements, the indicating elements being each movable between two rows of a pair, the two rows of graduations having their butts towards the vacant zone.

17. In combination, a chart for computing scales having a plurality of rows of designations comprising numerals and graduation lines terminating in butts, the rows being spaced from each other transversely of their length, each alternate row of designations being inverted in respect to the direction of its butts.

18. In combination, a chart for computing scales having a plurality of rows of designations comprising numerals and graduation lines terminating in butts, each alternate row being inverted in respect to the direction of its butts, the butts of the marks pertaining to the rows of the same pair being directed towards each other, the rows of each pair being spaced from each other transversely of their length.

19. In combination, a chart having spaced rows of graduations arranged in pairs, indicating elements cooperating with the rows of graduations, and between the same, a carrier common to all of said indicating elements above the surface of the chart, both ends of each indicating element being adapted to cooperate with a row of graduations and means for moving the carrier relatively to the chart.

20. In a computing scale, a chart having a row of value and a row of weight indications, the rows being spaced by a vacant zone and an indicating element in operative relation with said rows and having its ends in any position between the marginal lines of the zone.

21. In combination, a chart having pairs of rows of graduations, the graduations terminating in alined butts, and indicating elements in operative relation to said pairs of rows, the indicating elements being arranged with respect to the chart to intersect, if extended at both their ends, the two lines of the butts pertaining to the pair of rows.

22. In combination, a chart having rows of graduations which include marking lines terminating in alined butts, and indicating elements in operative relation to the rows of graduations, said indicating elements being located in the plane of the surface of the chart.

23. In combination, a chart having rows of graduations and having recesses adjacent the rows of graduations, and automatically movable indicating elements located in said recesses.

24. In combination, a chart having rows of graduations and having recesses adjacent the rows of graduations, and automatically and jointly movable elements located in said recesses.

25. In combination, a chart having rows of graduations, recesses adjacent said graduations, and automatically and jointly movable indicating elements located in said recesses and having a length substantially equal to the width of the recesses excepting working clearance.

26. In combination, a flat chart having rows of graduations arranged along portions of concentric circles, recesses in the chart also disposed along portions of concentric circles about the same center as the rows of graduations, indicating elements located in said recesses and means for jointly moving said indicating elements in the recesses through the same angle.

27. In combination, a fan shaped chart having rows of graduations disposed along portions of concentric circles, grooves concentric to said graduations between the same, a pointer bar movable at a distance from the plane of the chart and parallel thereto, fingers on the pointer bar projecting into said grooves, and indicating elements carried on said fingers.

28. In combination, a fan chart having a plurality of rows of concentric graduations, concentric grooves between said rows, a pointer bar oscillatable about the center of said rows at the bottom, fingers on the pointer bar deflected from the plane of rotation thereof so that their top surfaces are flush with the plane of the chart, and indicating elements on the deflected portions of said fingers.

29. In a scale, a fan chart having concentric rows of graduations, and grooves concentric therewith disposed between said rows, the pointer bar rotatable about an axis containing the center of said rows and grooves, a spindle on which said pointer bar is mounted, a bearing for said spindle preventing any movement but rotary movement of said pointer bar, and indicating elements supported by said pointer bar and adapted to travel in said grooves.

30. In a scale, a fan chart having concentric rows of graduations and grooves concentric therewith disposed between said rows, the pointer bar rotatable about an axis containing the center of said rows and grooves, a spindle on which said pointer bar is mounted, a bearing for said spindle preventing any movement but rotary movement of said pointer bar, indicating elements supported by said pointer bar and adapted to travel in said grooves, and means for actuating the pointer bar, said means including an element lifting upward.

31. A chart for a computing scale having a plurality of rows of designations consisting of value indications and unlike graduation marks and having grooves equidistantly related to said rows of unlike graduation marks.

32. In combination, a chart having rows of graduations unlike arranged in pairs and grooves between them, and linear indicating elements cooperating with the rows of graduations unlike and located in said grooves, both ends of each linear indicating element being adapted to cooperate with a row of graduations.

33. In combination, a chart having a plurality of curved rows of graduations, grooves concentric with said rows between the same, a pointer bar, means for producing relative movement between said chart and pointer bar, fingers on the pointer bar deflected from the plane of movement and arranged with respect to the chart in such manner that their top surfaces are flush with the chart, and indicating elements on the deflected portions of said fingers.

In witness whereof I affix my signature.

GEORGE HUTCHINSON.